US009392310B2

(12) United States Patent
Volovich et al.

(10) Patent No.: US 9,392,310 B2
(45) Date of Patent: Jul. 12, 2016

(54) METHOD AND SYSTEM FOR COLLECTING AND MANAGING TV VIEWERSHIP DATA

(75) Inventors: Yaroslav Volovich, Cambridge (GB); Raimundo Mirisola, London (GB); Simon Michael Rowe, Finchampstead (GB); Nick Arini, Southampton (GB); Andrew Gildfind, Brixton (GB); Ant Oztaskent, Sutton (GB); Iain Merrick, London (GB)

(73) Assignee: GOOGLE INC., Mountain View, CA (US)

( * ) Notice: Subject to any disclaimer, the term of this patent is extended or adjusted under 35 U.S.C. 154(b) by 208 days.

(21) Appl. No.: 14/342,343

(22) PCT Filed: Aug. 28, 2012

(86) PCT No.: PCT/US2012/052717
§ 371 (c)(1),
(2), (4) Date: Dec. 8, 2014

(87) PCT Pub. No.: WO2013/033123
PCT Pub. Date: Mar. 7, 2013

(65) Prior Publication Data
US 2015/0089523 A1      Mar. 26, 2015

Related U.S. Application Data

(60) Provisional application No. 61/529,808, filed on Aug. 31, 2011.

(51) Int. Cl.
*H04N 21/258*      (2011.01)
*H04N 21/25*       (2011.01)
(Continued)

(52) U.S. Cl.
CPC ............ *H04N 21/258* (2013.01); *H04H 60/31* (2013.01); *H04H 60/66* (2013.01);
(Continued)

(58) Field of Classification Search
None
See application file for complete search history.

(56) References Cited

U.S. PATENT DOCUMENTS

| 7,478,414 B1 | 1/2009 | Glusker et al. |
| 7,757,250 B1 | 7/2010 | Horvitz et al. |

(Continued)

FOREIGN PATENT DOCUMENTS

| EP | 1906350 | 4/2008 |
| JP | H10-42271 | 2/1998 |

(Continued)

OTHER PUBLICATIONS

Google Inc., International Preliminary Report on Patentability, PCT/US2012/052716, Mar. 13, 2014, 5 pgs.

(Continued)

*Primary Examiner* — Justin Shepard
(74) *Attorney, Agent, or Firm* — Morgan, Lewis & Bockius LLP

(57) ABSTRACT

A computer-implemented method for collecting and managing TV viewership data from multiple TV metering data providers is disclosed. The method includes: receiving an event log file at a distributed computer system that includes multiple computers; dynamically selecting one or more computers according to a predefined sharding function; at each of the selected computers: allocating a set of compressed event records, which corresponds to a subset of the event log file, at predetermined locations within the memory of the computer; and in accordance with a predefined schedule, replicating the compressed event records from a respective one of the selected computers to one or more other computers of the distributed system such that there are at least two replicas of any event record on at least two computers of the distributed computer system.

23 Claims, 8 Drawing Sheets

(51) Int. Cl.
  *H04N 21/254* (2011.01)
  *H04N 21/231* (2011.01)
  *H04N 21/2665* (2011.01)
  *H04N 21/426* (2011.01)
  *H04N 21/442* (2011.01)
  *H04N 21/658* (2011.01)
  *H04H 60/31* (2008.01)
  *H04H 60/66* (2008.01)
  *H04N 21/2543* (2011.01)

(52) U.S. Cl.
  CPC .. *H04N 21/23103* (2013.01); *H04N 21/23116* (2013.01); *H04N 21/25* (2013.01); *H04N 21/254* (2013.01); *H04N 21/25808* (2013.01); *H04N 21/25866* (2013.01); *H04N 21/2665* (2013.01); *H04N 21/42684* (2013.01); *H04N 21/44222* (2013.01); *H04N 21/6582* (2013.01); *H04N 21/2543* (2013.01)

(56) References Cited

U.S. PATENT DOCUMENTS

| | | |
|---|---|---|
| 2002/0078469 A1 | 6/2002 | Kano |
| 2002/0178441 A1 | 11/2002 | Hashimoto |
| 2003/0188171 A1 | 10/2003 | DeCenzo et al. |
| 2004/0049788 A1 | 3/2004 | Mori et al. |
| 2007/0011700 A1 | 1/2007 | Johnson |
| 2007/0076728 A1 | 4/2007 | Rieger et al. |
| 2007/0204298 A1 | 8/2007 | Shanks et al. |
| 2007/0206606 A1 | 9/2007 | Coleman et al. |
| 2007/0266401 A1 | 11/2007 | Hallberg |
| 2007/0271591 A1 | 11/2007 | Izumi et al. |
| 2008/0222106 A1 | 9/2008 | Rao et al. |
| 2008/0259906 A1 | 10/2008 | Shkedi |
| 2008/0271078 A1 | 10/2008 | Gossweiler et al. |
| 2008/0294625 A1 | 11/2008 | Takeuchi |
| 2009/0083780 A1 | 3/2009 | Beyabani |
| 2009/0158162 A1 | 6/2009 | Imai |
| 2009/0172728 A1 | 7/2009 | Shkedi et al. |
| 2009/0259518 A1 | 10/2009 | Harvey et al. |
| 2010/0064320 A1 | 3/2010 | Angiolillo et al. |
| 2010/0131969 A1 | 5/2010 | Tidwell et al. |
| 2010/0161492 A1 | 6/2010 | Harvey et al. |
| 2011/0288907 A1* | 11/2011 | Harvey .............. G06Q 10/0639 705/7.29 |
| 2012/0249568 A1* | 10/2012 | Gildfind ............. G06Q 30/0241 345/581 |

FOREIGN PATENT DOCUMENTS

| | | |
|---|---|---|
| JP | 2002-132822 | 5/2002 |
| JP | 2003-284008 | 10/2003 |
| JP | 2003-319366 | 11/2003 |
| JP | 2009-193498 | 8/2009 |
| JP | 2009-259119 | 11/2009 |
| JP | 2010-074518 | 4/2010 |
| JP | 2010-206534 | 9/2010 |
| JP | 2010-212953 | 9/2010 |
| WO | WO 2009/024873 A2 | 9/2009 |
| WO | WO 2009/149128 | 12/2009 |

OTHER PUBLICATIONS

Google Inc., International Preliminary Report on Patentability, PCT/US2012/052717, Mar. 13, 2014, 8 pgs.

Google Inc., Supplementary European Search Report, EP 12826755.6, Jun. 17, 2015, 6 pgs.

Google Inc., Supplementary European Search Report, EP 12828665.5, Apr. 24, 2015, 7 pgs.

Google Inc., International Search Report and Written Opinion, PCT/US2011/054722, Jan. 5, 2012, 7 pgs.

Google Inc., International Search Report and Written Opinion, PCT/US2011/054724, Dec. 28, 2011, 6 pgs.

Google Inc., Notice of Reasons for Rejection, JP 2013-532876, Apr. 21, 2015, 4 pgs.

Google Inc., Notice of Reasons for Rejection, JP 2013-532877, Mar. 27, 2015, 5 pgs.

Google Inc., Decision of Rejection, JP Patent Application, 2013-532877, Dec. 22, 2015, 3 pgs.

Google Inc., International Search Report and Written Opinion, PCT/US2012/052716, Dec. 28, 2012, 6 pgs.

Google Inc., International Search Report and Written Opinion, PCT/US2012/052717, Feb. 28, 2013, 10 pgs.

* cited by examiner

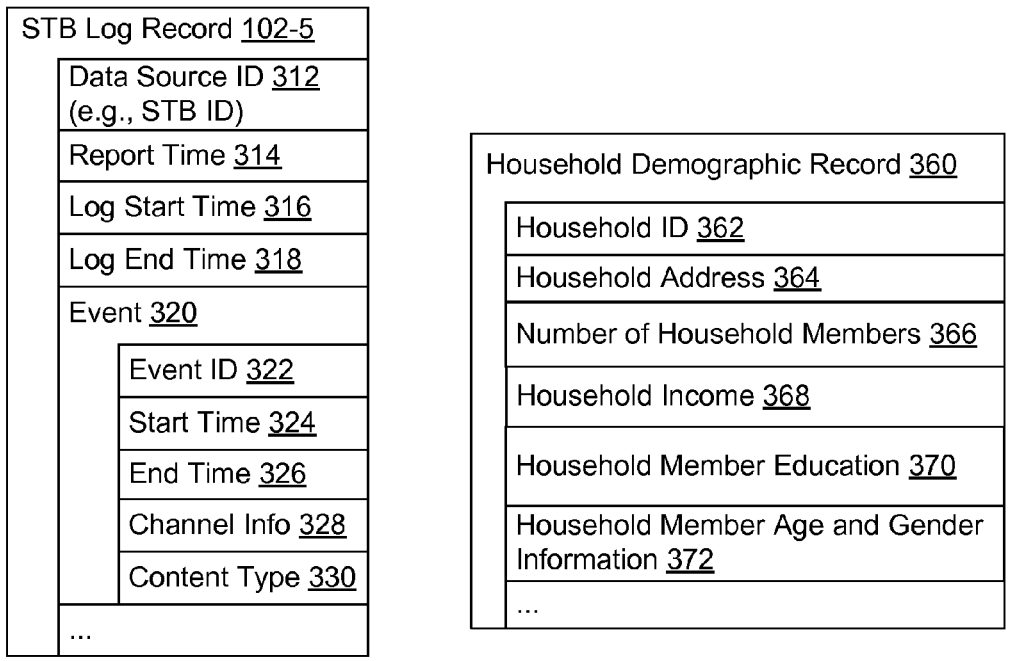
FIG. 3B
FIG. 3D
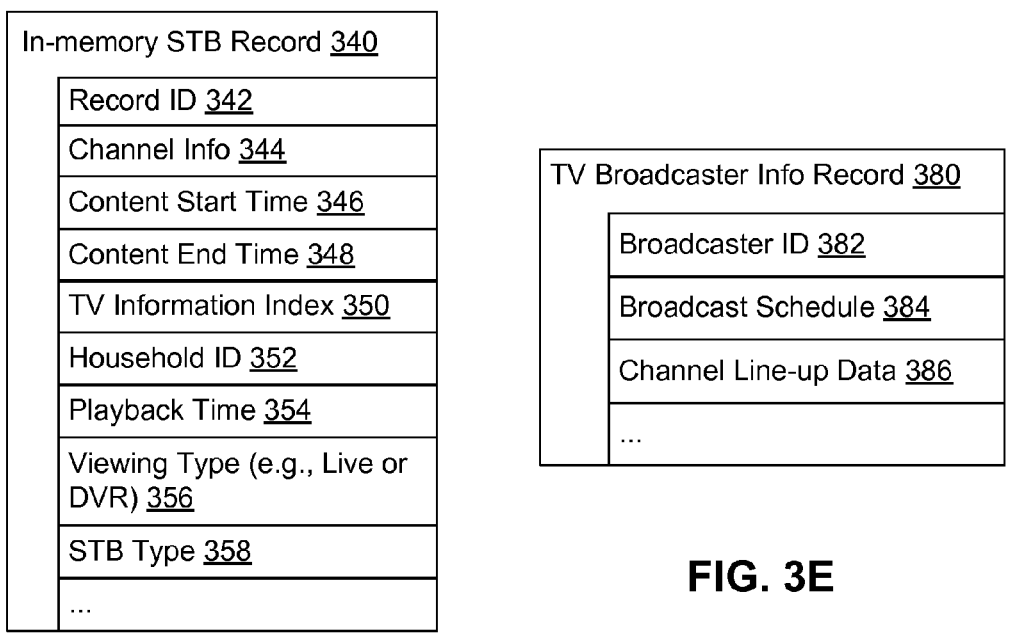
FIG. 3C
FIG. 3E

METHOD AND SYSTEM FOR COLLECTING AND MANAGING TV VIEWERSHIP DATA

CROSS REFERENCE TO RELATED APPLICATIONS

This Application is a United States National Stage Application filed under 35 U.S.C. §371 of PCT Patent Application Serial No. PCT/US2012/052717 filed on Aug. 28, 2012, which claims the benefit of and priority to U.S. Provisional Patent Application No. 61/529,808 filed on Aug. 31, 2011, which are hereby incorporated by reference in their entireties.

TECHNICAL FIELD

The disclosed implementations relate generally to TV viewership ratings, and in particular, to system and method for collecting and managing TV viewership data.

BACKGROUND

Nowadays, people can get the same TV content from different vendors through different communication channels, such as satellite, cable, phone line, and Internet. The choice of communication channels often has many geographic and demographic considerations. For example, satellite receivers may be the most commonly used devices for households in the rural areas to receive TV signals. But it is probably more common for households in big metropolitan areas to use cable connections or over the air (OTA) antennas to receive TV signals. Although many people still watch TV programs on TVs, younger viewers may increasingly choose to watch TV programs on a computer that is coupled to the Internet, or even a smartphone supporting 3G/4G wireless communications. The existence of diversified communication channels for receiving TV programs is that it is more challenging to provide an efficient, accurate estimate of the viewership rating for a particular TV program at a large population level (e.g., at a national level).

SUMMARY

In accordance with some implementations described below, a computer-implemented method for collecting and managing TV viewership data is disclosed. The method is implemented at a distributed computer system including multiple computers, each computer having one or more processors and memory storing multiple event records, each event record including a predefined time interval. The method includes: receiving an event log file that includes a plurality of data source IDs, each data source ID having an associated set of event log entries and each event log entry including a time interval; dynamically selecting one or more computers by applying the plurality of data source IDs to a predefined sharding function; at each of the selected computers: identifying at least one of the plurality of data source IDs that matches at least one of the event records stored on the computer; for each identified data source ID and each of the set of event log entries associated with the identified data source ID: determining a location in the memory of the computer in accordance with the event log entry's time interval and the time intervals of the event records stored on the memory of the computer; generating a new event record for the event log entry, wherein the new event record includes the time interval associated with the event log entry; storing the new event record at the determined location within the memory of the computer; and in accordance with a predefined schedule, replicating the compressed event records from a respective one of the selected computers to one or more other computers of the distributed system such that there are at least two replicas of any event record on at least two computers of the distributed computer system.

In accordance with some implementations described below, a distributed computer system for collecting and managing TV viewership data is disclosed, the distributed computer system including multiple computers, each computer having one or more processors and memory storing multiple event records, each event record including a predefined time interval. The one or more programs include instructions for: receiving an event log file that includes a plurality of data source IDs, each data source ID having an associated set of event log entries and each event log entry including a time interval; dynamically selecting one or more computers by applying the plurality of data source IDs to a predefined sharding function; at each of the selected computers: identifying at least one of the plurality of data source IDs that matches at least one of the event records stored on the computer; for each identified data source ID and each of the set of event log entries associated with the identified data source ID: determining a location in the memory of the computer in accordance with the event log entry's time interval and the time intervals of the event records stored on the memory of the computer; generating a new event record for the event log entry, wherein the new event record includes the time interval associated with the event log entry; storing the new event record at the determined location within the memory of the computer; and in accordance with a predefined schedule, replicating the compressed event records from a respective one of the selected computers to one or more other computers of the distributed system such that there are at least two replicas of any event record on at least two computers of the distributed computer system.

In accordance with some implementations described below, a non-transitory computer readable-storage medium storing one or more programs for execution by one or more processors of a computer system for collecting and managing TV viewership data is disclosed. The one or more programs include instructions for: receiving an event log file that includes a plurality of data source IDs, each data source ID having an associated set of event log entries and each event log entry including a time interval; dynamically selecting one or more computers by applying the plurality of data source IDs to a predefined sharding function; at each of the selected computers: identifying at least one of the plurality of data source IDs that matches at least one of the event records stored on the computer; for each identified data source ID and each of the set of event log entries associated with the identified data source ID: determining a location in the memory of the computer in accordance with the event log entry's time interval and the time intervals of the event records stored on the memory of the computer; generating a new event record for the event log entry, wherein the new event record includes the time interval associated with the event log entry; storing the new event record at the determined location within the memory of the computer; and in accordance with a predefined schedule, replicating the compressed event records from a respective one of the selected computers to one or more other computers of the distributed system such that there are at least two replicas of any event record on at least two computers of the distributed computer system.

BRIEF DESCRIPTION OF DRAWINGS

The aforementioned implementation of the invention as well as additional implementations will be more clearly

FIG. 3B is a block diagram illustrating a data structure used by a data source for organizing TV viewership metering data in accordance with some implementations.

FIG. 3C is a block diagrams illustrating a data structure used by the distributed measurement server for storing TV viewership metering data in accordance with some implementations.

FIG. 3D is a block diagram illustrating a data structure used by the distributed measurement server for storing a household's demographic data in accordance with some implementations.

FIG. 3E is a block diagram illustrating a data structure used by the distributed measurement server for storing TV broadcaster information in accordance with some implementations.

DETAILED DESCRIPTION

TV viewership in national markets can be quite fragmented. In some implementations, a TV viewership projection system receives raw viewership data from a variety of TV content providers (e.g., cable and satellite companies, over the air broadcasters and Internet streaming sites). The TV viewership projection system aggregates the raw data from each of the different content providers for different geodemographic groups (i.e., particular viewer demographics, geographic regions, and/or some combination of both characteristics) and computes viewership share information for particular groups at a level that is statistically significant. For example, the TV viewership projection system computes per-minute share information when there is enough data (e.g., in metropolitan areas), and per-hour share information when there is not enough data to reliably determine per-minute share information (e.g., in sparsely populated areas where there are few subscribers for a particular service/content provider). The TV viewership projection system then combines the share information from disparate content providers by weighting the different components in order to produce reliable share information for larger areas than covered by the information from the disparate providers. In some situations, the viewership share information covers the same geodemographic groups (e.g., viewership information for the same geographical regions from a satellite provider and a cable provider). Also, by combining and weighting viewership share information for different content providers, it becomes possible to generate reliable information for geodemographic groups that are not adequately represented in either group individually (e.g., share information for a cable provider A and a satellite provide B might not include adequate information for the same geo-demographic group X individually, but when combined they do).

Figure 1A:
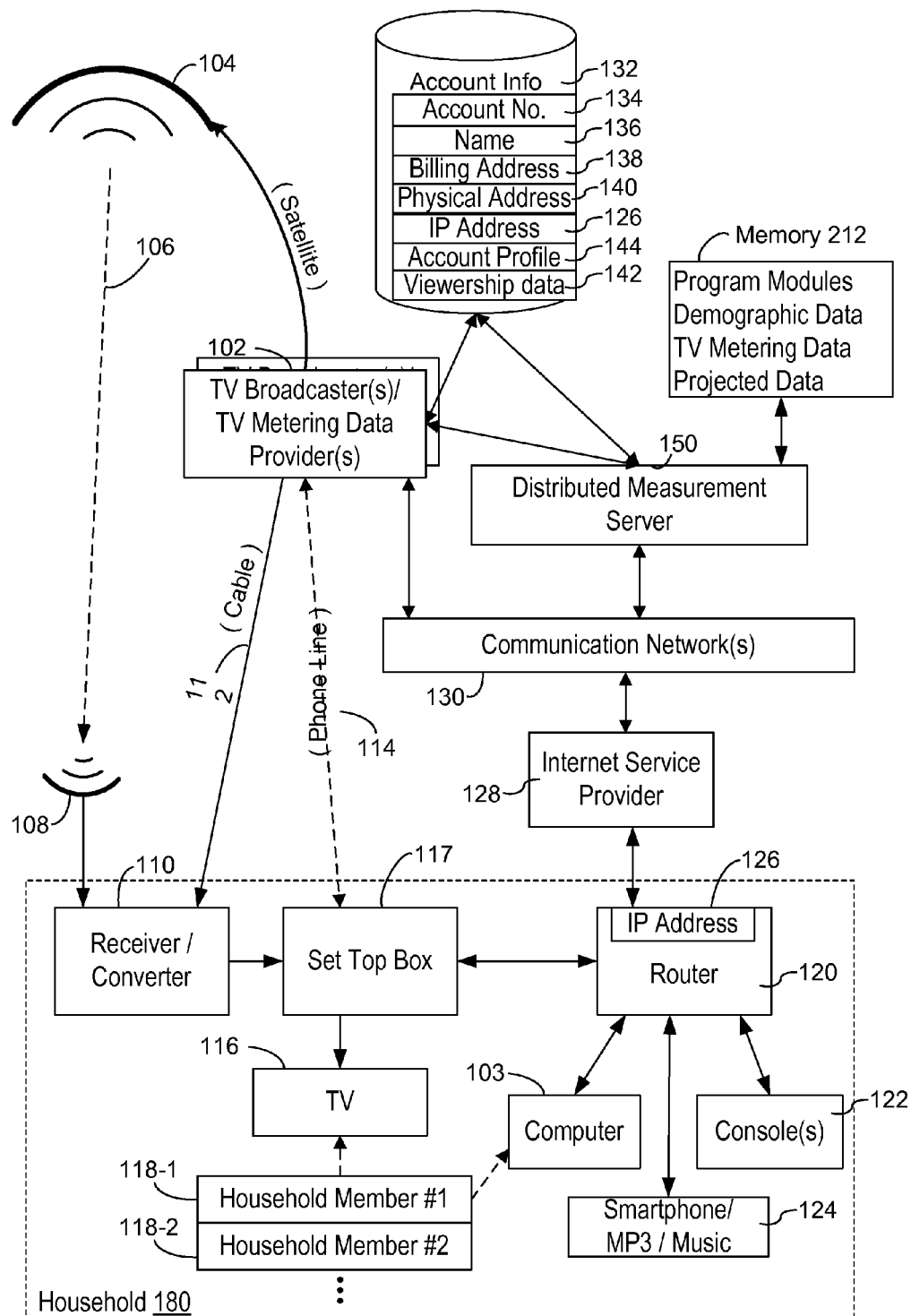
FIG. 1A is a block diagram illustrating a distributed TV content delivery system including a plurality of communication channels for delivering TV signals to a household and distributed measurement server for estimating the TV viewership ratings in accordance with some implementations.
Figure 1B:
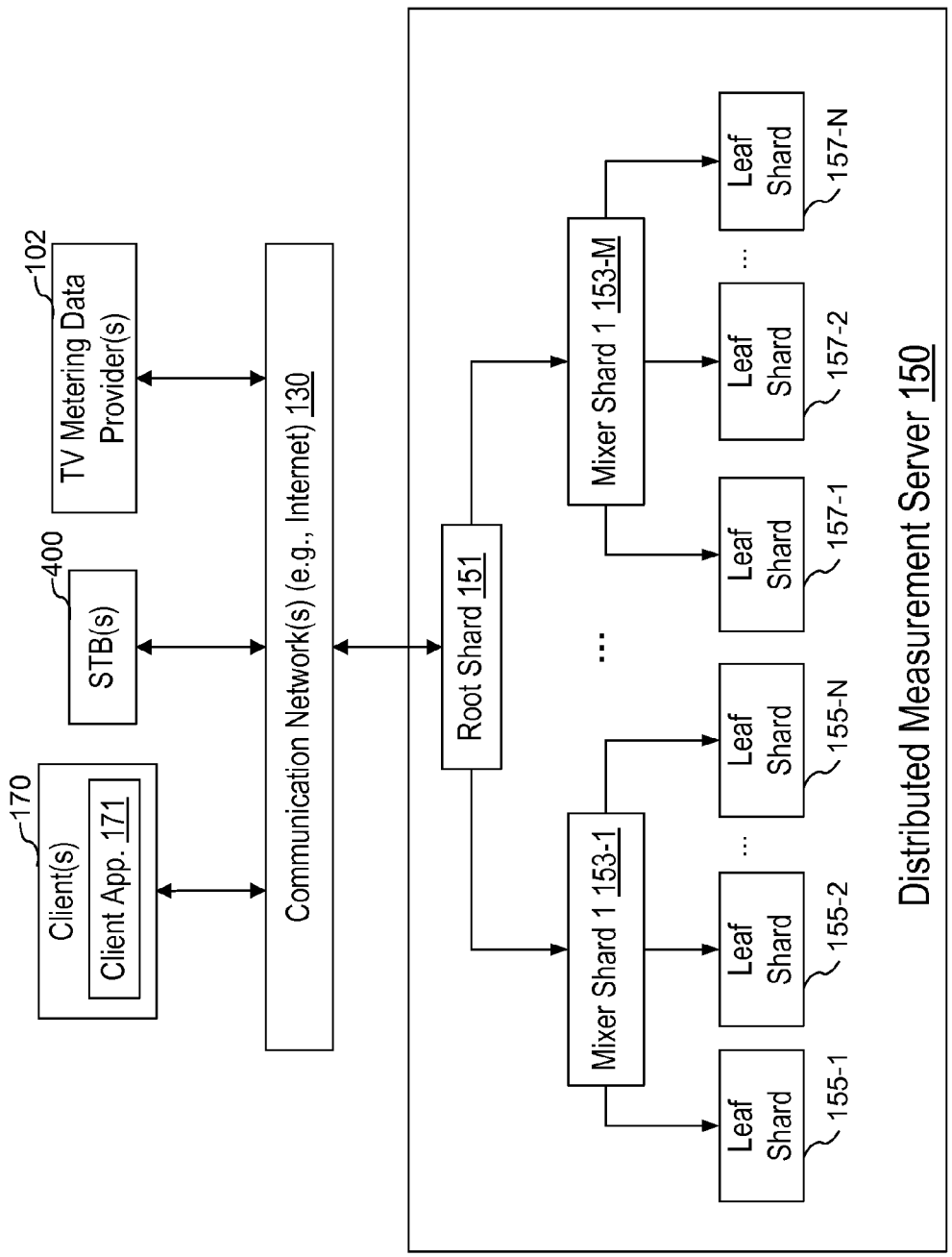
FIG. 1B is a block diagram illustrating the components of a distributed measurement server for collecting TV viewership metering data from multiple sources and providing estimates of TV viewership ratings to requesting clients in accordance with some implementations.

FIG. 1 is a block diagram illustrating a distributed TV content delivery system including a plurality of communication channels for delivering TV signals to a household in accordance with some implementations. In some implementations, one or more TV broadcasters/TV metering data providers 102 collect account information for particular subscriber households 180 that is retained in one or more account information databases 132. This information 132 is accessed by a distributed measurement server 150, which, in response to queries, aggregates and analyzes the information to determine TV viewership ratings for one or more TV programs for a range of geodemographic groups (e.g., different combinations of viewers by age, sex and geographic region). In some implementations, as shown in FIG. 1, there is more than one provider of TV viewership metering data, each metering data provider monitoring a particular geographic and demographic section of the entire TV population. As such, there are discrepancies between the TV viewership metering datasets collected by different providers. In order to utilize these datasets to produce a national or regional TV viewership rating, the distributed measurement server 150 may apply certain weights to the TV viewership metering data from different providers and "blend" them into one TV viewership rating for a TV program for a particular population. To accomplish this task, the distributed measurement server has a memory 212 for storing program modules as well as data required for making this estimate. A more detailed description of the distributed measurement server and the related program modules and data is provided below in connection with FIGS. 1B through 4.

In some implementations, the households 180 for which account and viewership information is retained in the database 132 are participants in TV viewership panels who have agreed that their TV viewing, account and demographic information can be collected, aggregated and analyzed to allow the distributed measurement server 150 to determine TV viewing data for participant households 180. The account information database 132 generally includes an account number 134, a name 136, and a billing address 138 for each participant household. In some implementations, the account information 132 also includes a physical address 140, such as a residence address for a household, and/or an IP address 126 associated with one or more Internet-enabled devices used by the household 180 to access and view streaming TV content and/or Internet-based services generally. In some cases, the household 180 has a fixed IP address 126, in which case the fixed IP address 126 is associated with the household's account in the database 132. In other cases, the household 180 has a dynamically-allocated IP address, which can change on a regular basis (e.g., every time a household member "dials up," or makes a new connection to, the Internet service provider 128 (ISP)). In this case, the broadcaster/provider 102 tracks the changes to the household's IP address 126 and updates the record in the database 132 accordingly. In some cases, the account information database 132 includes an account profile 144 associated with each household. The account profile 144 may include one or more demographic parameters that characterize the members of the household including, but not limited to, the number of household members and the age, gender, educational level, income, and profession of at least one household member. As described below, information in the account profile 144 is used for querying the viewership data in response to a client request or minimizing the bias associated with the viewership data collected by one provider when projecting the TV viewership rating from the collected viewership data. In some cases, the account information database 132 includes the TV viewership data 142 that represents the television viewing activity of the household 180 associated with each account. For example, the TV viewing activity can include information on every program viewed by the household, including, for each program, a name and description of the program, the channel that played the program, the date/time of the viewing, etc. In other implementations, the TV viewing activity saved in the database 132 includes only programs that are viewed for at least a threshold amount of time (e.g., 1 minute or 5 minutes) as well as the start time of a program and the end time of the program. In some implementations, the viewing activity tracked includes only premium content. The TV viewership data 142 may include either the raw data sample collected from a household, such as the date and time when the data sample was collected and information about the TV program being broadcasted in the household when the data sample was collected, or the pre-processed data sample, such as the broadcasting duration of the TV program in the household. As shown in FIG. 1, the database 132 may include the TV viewership data collected from multiple TV broadcasters (or TV metering data providers) 102. A data pre-processing procedure may be applied to the data from different sources if their formats are different from the one used by the database 132. The terms like "viewership data" and "metering data" are used interchangeably throughout this application.

In some implementations, the TV broadcaster is only responsible for broadcasting TV signals while a separate TV metering data provider is in charge of collecting TV metering data for different TV programs from the households. In some other implementations, the TV broadcaster and the TV metering data provider operate as single entity that is responsible from both broadcasting TV signals and collecting the TV metering data. But the implementations of the present application apply to either configuration. For simplicity, the rest of the present application will use the term "TV metering data provider" to represent both entities. From the context in which the term appears, one of ordinary skill in the art would understand which entity it refers to.

As show in FIG. 1, the TV metering data providers 102 may transmit the television programs to the household 180 over a cable 112, by transmission from a satellite 104, or by streaming over the communication networks 130 (e.g., Internet). In the case of satellite transmissions 106, the household 180 has a receiver antenna 108 to receive the signal. In the household 180 there is a receiver or converter 110 to process or decode the incoming TV signals. The decoded TV signals are transmitted to a set top box (STB) 117, which allows household members 118 to control what is being displayed on the television 116. In some implementations, the receiver/converter 110 is combined with the STB 117. In general, a household member, such as member 118-1 or 118-2 controls the STB 117 with a remote control device. In some implementations, there is additional communication between the TV metering data provider 102 and the STB 117 over a telephone line 114. For example, the STB 117 may provide information about what television programs are being viewed, or may receive further information from the TV metering data provider 102 for interactive television programs. The TV metering data provider 102 processes information about the household members' viewing activity from the STB 117 and stores the processed information in the database 132.

In some implementations, the household members' viewing activity is identified by the receiver/converter 110, and transmitted back to the TV metering data provider 102 through the STB 117, which is connected to the communication network 130 (e.g., the Internet) through a wired or wireless home router 120. In other implementations, the STB 117 is able to ascertain the program viewed by evaluating the signal received from the receiver/converter 110. In these implementations, the STB 117 transmits the viewing information (e.g., program, channel, date/time, etc.) to the TV metering data provider 102, again via the household router 120. Because the viewing information is transmitted through the household router 120, the IP address 126 of the household router 120 is also transmitted to the TV metering data provider 102 along with the viewing information. In some implementations the IP address 126 and/or the viewing information is transmitted to the TV metering data provider 102 on a periodic basis (e.g., from once an hour, to once a day or even once a week). Between two consecutive transmissions, the data is stored in the STB 117. As noted above, in some alternative implementations, the STB 117 transmits data to the TV metering data provider 102 over a phone line 114. In these implementations, the STB 117 is able to retrieve the IP address 126 from the router 120 and transmit it with the viewing data.

The actual television program signals are generally transmitted by satellite 104, over a cable 112, or via terrestrial TV transmissions (i.e., conventional TV broadcast). In some implementations, the television programs are streamed over the communications network 130, such as the Internet. In these implementations, the process of selecting a television program may be performed by a computer 103, the STB 117, or a receiver/converter 110 that is connected directly to the household router 120 (not shown in FIG. 1). The household router 120 is the gateway to the Internet from the household 180. Inside the household 180, the router 120 is connected to the STB 117, and in some cases to a number of computers 103, smartphones or digital audio players 124, or game consoles 122, such as XBOX, PLAYSTATION or WII. The router 120 is connected to the communication network 130 through an Internet service provider 128 that assigns the IP address 126 to the home router 120.

The computers 103 in the household 180 can access the Internet to perform myriad activities, such as watching TV programs streamed from the TV metering data provider 102 through the communication networks 130, the Internet service provider 128, and the household router 120, shopping, viewing videos online (e.g., on YouTube), playing online games, participating in online social networks, or engaging in many other activities. The TV program viewing activities are logged by the TV metering data provider 102 in the database 132 and tracked by the IP Address 126 of the household 180 because it is readily available and it is a unique identifier (at least at a specific point in time). One of ordinary skill in the art would recognize that the data identified in the account information database 132 could all be found in a single database, or distributed to a different number of databases depending on the implementation.

In some implementations, the distributed measurement server 150 is coupled to the TV metering data providers 102 or the account information database 132 or both for receiving many households' metering data collected by the TV metering data providers as well as their demographic data. In some other implementations, the distributed measurement server 150 receives metering data from the household's STB 117 via the communication networks 130, the ISP 128, and the household router 120. As noted below, the distributed measurement server 150 manages a copy of the metering and demographic data of its own for estimating TV viewership ratings in response to queries from its clients and providing such rating information to the requesting clients. As will be described below in detail, the distributed measurement server 150 applies a set of criteria to the TV metering data stored on its memory to determine a reasonable estimate of a client-requested viewership rating within a short time frame ranging from, e.g., less than a second to a few minutes. In some implementations, the distributed measurement server 150 allocates different weights to the data from different providers to eliminate or reduce the associated bias, the weights being a function of one or more geodemographic factors, including location, gender, age, income, education, etc.

FIG. 1B is a block diagram illustrating the components of the distributed measurement server 150 for collecting the TV viewership metering data from multiple sources such as STBs 117 and TV metering data providers 102 and providing estimates of TV viewership ratings to the requesting clients 170 in accordance with some implementations. In order to handle a large amount of TV viewership data, the distributed measurement server 150 may include hundreds (e.g., 512) of computers, each computer responsible for managing a subset of the TV viewership data (also known as a "shard") that is determined in accordance with a predefined sharding function. As shown in FIG. 1B, the hundreds of computers are classified into three tiers in accordance with their respective functionalities and the three tiers of computers are linked together according to a tree-like hierarchical architecture as shown in FIG. 1B.

The root node of the hierarchical architecture is referred to as a "root shard" 151. Depending on the total number of computers within a distributed measurement server, the hierarchical architecture may include zero or more layers of intermediate nodes. In the example shown in FIG. 1, the distributed measurement server 150 includes one layer of intermediate nodes, which are referred to as "mixer shards" (153-1, 153-M). Each mixer shard manages a predefined number (e.g., 16) of leaf shards (e.g., 155 or 157). When the distributed measurement server 150 imports new metering data from the data sources (e.g., STB 117 and TV metering data provider(s) 102), the root shard 151 is responsible for selecting one or more leaf shards in accordance with the predefined sharding function to allocate the new metering data within the distributed measurement server 150. A more detailed description of the data importation process in the distributed measurement server 150 is provided below in connection with FIG. 4A. When the distributed measurement server 150 receives a query from a client 170, the root shard 151 is responsible for selecting one or more leaf shards in accordance with the predefined sharding function for processing the query. The leaf shards submit the query results to the respective mixer shards 153. The mixer shards 153 aggregate the query results and submit the aggregated query results to the root shard 151 to be returned to the requesting client 170. A more detailed description of the query processing in the distributed measurement server 150 is provided below in connection with FIGS. 4B and 4C. In some implementations, the root/mixer/leaf shards correspond to three types of software modules such that different types of shards shown in FIG. 1B may operate on the same computer within the distributed measurement server 150. For example, a computer that is responsible for managing a shard of metering data like the leaf shard 155-1 may also act as the mixer shard 153-1 for receiving query results from other leaf shards (155-2, 155-N) and maybe even the root shard 151.

In some implementations, the sharding function is a hash table function that defines a mapping relationship from a TV viewership data record and one or more leaf shards such that, for a given data record, the root shard 151 can determine which leaf shard(s) stores the data record (when responding to a query) or which leaf shard(s) is to store the data record (when receiving new metering data). As an example, an exemplary sharding function is defined as:

$$\text{Shard\_Number}=\text{hash}\_K(\text{TV\_ID},\text{STB\_ID},\text{Broadcaster\_ID})$$

wherein "hash_K" refers to a predefined hash table function that maps the input metering data (or query) to a respective leaf shard with a serial number in the range of [1, . . . , K] and K is the total number of unique leaf shards (i.e., not counting the redundant replicas for each unique leaf shard) within the distributed measurement server 150, which serves as the modulo of the hash table function. The parameter "TV_ID" identifies a unique TV within a household and the parameter "STB_ID" identifies a unique STB that the TV is connected to. The parameter "Broadcaster_ID" identifies a unique TV content provider that provides the TV programs to the STB. In some implementations, one household may have multiple TVs connected to multiple STBs in order to receive contents from different TV content providers. Based on these three parameters, the root shard 151 determines which of the leaf shards is responsible for allocating the metering data generated for a particular TV within a particular household. For illustrative purposes, some of the examples described below in connection with FIGS. 4A-4C assume that one household has one STB such that the household ID is equivalent to the STB_ID.

In some implementations, the distributed measurement server 150 is configured through the sharding function such that metering data from one data source are spread over multiple leaf shards, which may be associated with the same or different mixer shards. For example, one leaf shard is not allowed to store more than 5% of the metering data from the same data provider. By doing so, the distributed measurement server 150 can provide an estimated rating in response to a query even if one or more leaf shards identified as having the metering data associated with the query is temporarily or permanently unavailable because of system maintenance or other reasons. In some implementations, the distributed measurement server 150 is configured to maintain a predefined number of replicas of the same metering data on different computers associated with different leaf nodes. The root shard 151 is configured to monitor the usage of the metering data replicas at different leaf shards such that, upon receipt of a query for the metering data, the root shard 151 can not only find which leaf shards have the requested metering data but also select those leaf shards of less work load to process the query. On the other hand, the metering data associated with the same household is stored on the same computer's memory and managed by the same leaf shard. In other words, when the distributed measurement server finds a first leaf shard as having the metering data associated with a household identified by a query, it does not need to look for a second leaf shard because any other leaf shard has either the same metering data as the first leaf shard (i.e., a replica) or nothing at all.

The configuration of spreading the metering data from the same data source over multiple leaf shards and maintaining multiple replicas of the same leaf shard not only improves the load balance of the distributed measurement server but also makes it more fault tolerant. For a given query, there may be multiple leaf shards as having the metering data related to the query. The root shard 151 may identify a subset of the multiple leaf shards for responding to the query based on the current work load at these leaf shards. If one of the identified leaf shards is unavailable, the root shard 151 can choose another leaf shard that has a replica of the requested metering data to replace the original leaf shard. This is especially useful if the client 170 accepts a partial query result (e.g., the client may specify in the query that a query result is acceptable if its accuracy is above a predefined threshold or if it results from processing a predefined amount of metering data but less than the entire metering data set).

In some implementations, the distributed measurement server 150 provides a predefined application programming interface (API) for the client 170 to interact with the server 150. This API may support an existing query language such as SQL or define a more flexible new query language based on the organization of the metering data on the leaf shards. For example, both the API and a client application 171 may be implemented in Java. Upon receipt of a query submitted by the client application 171, the root shard 151 examines the query to make sure that it is correct and has no grammatical error and then interprets the query to determine which leaf shards may have the metering data that may match the query. For example, if the query is to determine the TV viewership rating for a particular show broadcasted by a particular broadcaster, the root shard 151 first identifies one or more leaf shards that store the metering data provided by this particular broadcaster and then submits the query to one or more of the identified leaf shards based on the factors such as a leaf shard's current load balance, the amount of related metering data stored on the leaf shard, and the rating accuracy if specified by the client.

At each chosen leaf shard, a query engine is responsible for applying the query to the metering data stored on the leaf shard. This process is to compare the query's conditions with each metering data record in the memory of the computer and determine whether this data record satisfies the query's conditions or not. In some implementations, the query engine maintains a count of data records that satisfy the query such that the count increases by one whenever a new metering data record is found satisfying the query until the last data records is examined.

Because the metering data is distributed on multiple leaf shards, each leaf shard having its own query engine, multiple counts of data records that satisfy the query are generated independently by different leaf shards and then submitted to respective mixer shards associated with these leaf shards. In some implementations, the mixer shards aggregate the multiple counts into one and submit the aggregated total count of data records that satisfy the query to the root shard 151, which is returned to the requesting client 170 as at least part of the response to the query.

Figure 2:
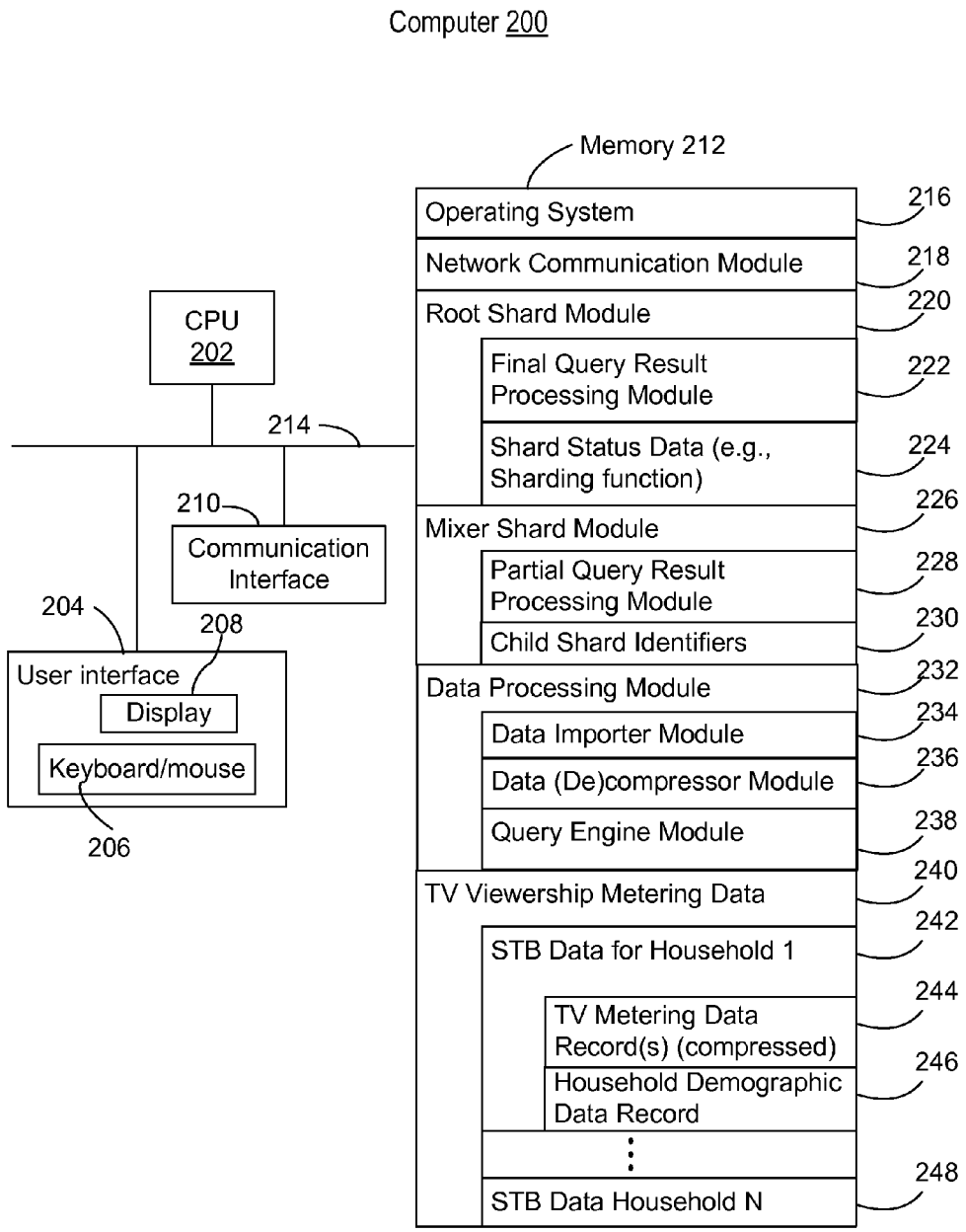
FIG. 2 is a block diagram illustrating the components of a computer running as a root/mixer/leaf shard member of the distributed measurement server in accordance with some implementations.

As noted above, the distributed measurement server 150 may include multiple computers and each computer may support multiple types of shards. FIG. 2 is a block diagram illustrating the components of a computer 200 running as a root/mixer/leaf shard member of the distributed measurement server in accordance with some implementations. The computer 200 includes one or more processing units (CPU's) 202 for executing modules, programs and/or instructions stored in memory 212 and thereby performing processing operations; one or more network or other communications interfaces 210; memory 212; and one or more communication buses 214 for interconnecting these components. In some implementations, the computer 200 includes a user interface 204 comprising a display device 208 and one or more input devices 206 (e.g., keyboard or mouse). In some implementations, the memory 212 includes high-speed random access memory, such as DRAM, SRAM, DDR RAM or other random access solid state memory devices. In some implementations, memory 212 includes non-volatile memory, such as one or more magnetic disk storage devices, optical disk storage devices, flash memory devices, or other non-volatile solid state storage devices. In some implementations, memory 212 includes one or more storage devices remotely located from the CPU(s) 202. Memory 212, or alternately the non-volatile memory device(s) within memory 212, comprises a non-transitory computer readable storage medium. In some implementations, memory 212 or the computer readable storage medium of memory 212 stores the following elements, or a subset of these elements, and may also include additional elements:

- an operating system 216 that includes procedures for handling various basic system services and for performing hardware dependent tasks;
- a network communications module 218 that is used for connecting the projection server 200 to other computers via the communication network interfaces 210 and one or more communication networks (wired or wireless), such as the Internet, other wide area networks, local area networks, metropolitan area networks, and so on;
- a root shard module 220 for receiving new TV metering data from multiple data sources and queries from clients and returning query results to the requesting clients 170;
- a mixer shard module 226 for managing a predefined number of leaf shards, including aggregating the query results returned by the leaf shards;
- a data processing module 232 for processing the metering data stored in the memory 212 in connection with importing new metering data or responding to a query; and
- TV viewership metering data 240 (e.g., STB data organized household by household) wherein the STB data 242 for each household includes both a plurality of compressed TV metering data records 244 and a household demographic data record 246.

In some implementations, the root shard module 220 may further include the following elements:

- a final query result processing module 222 for preparing the query results returned by the leaf shards and the mixer shards into a final query result to be returned to the requesting client in accordance with the query; and
- shard status data 224 that is used for defining how the metering data are stored by the leaf shards such that the root shard module 220 can determine which one or more leaf shards to store the incoming metering data and which one or more leaf shards to respond to a the newly-received query, in some implementations, the shard status data 224 is expressed in the form of a predefined sharding function.

In some implementations, the mixer shard module 226 may further include the following elements:

- a partial query result processing module 228 for preparing the query results returned by the leaf shards through, e.g., aggregation, and submitting the processed query result to the root shard; and
- child shard identifiers 230 for identifying a predefined set of leaf or mixer shards that report query results to this mixer shard.

In some implementations, the data processing module 232 may further include the following elements:

- a data importer module 234 for importing and allocating the incoming metering data and demographic data in the memory 212;
- a data (de)compressor module 236 for converting the incoming metering data from its native format into a predefined format, if necessary, and compressing the incoming metering data record by record to be stored in the memory 212 or decompressing the compressed metering data records when responding to a query; and
- a query engine module 238 for applying a query to a TV metering data record to determine whether the record satisfies the query's criteria or not.

In order to provide service to clients 170, the distributed measurement server 150 needs to have the TV metering data of many households. As noted above in connection with FIG. 1A, there are multiple ways for the distributed measurement server 150 to access the TV metering data. For example, the TV metering data providers 102 may receive the metering data (e.g., in the form of STB logs) from respective subscribing households. Because the distributed measurement server 150 is coupled to the TV metering data providers 102, the TV metering data providers 102 can forward the STB logs to the distributed measurement server. In some implementations, the TV metering data providers 102 stores the metering data in the account information database 132 (e.g., the viewership data 142) and provides the access to the database 132 to the distributed measurement server 150. In this case, the distributed measurement server 150 can receive the new metering data directly from the account information database 132. In some implementations, the distributed measurement server 150 can also receive the viewership data directly from individual households 180. In this case, the STB 117 in the household 180 provides the STB log generated by the box to the distributed measurement server 150 through the household router 120, the ISP 128 and the communication networks 130. As will be explained below, the distributed measurement server 150 can find a location for hosting an incoming new metering data record regardless of whether the data record comes from a TV metering data provider 102 or an STB 117 in a household.

In some implementations, different TV metering data providers 102 may have different schedules for providing the metering data. Some provider may provide new metering data to the distributed measurement server 150 after a predefined time interval ranging from a day or a week. This relatively long delay may be related to the fact that the TV metering data provider 102 is usually associated with a large number of households (e.g., ranging from tens of thousands to multi-millions) and it may need to wait longer for collecting the STB logs from all the subscribers and then apply predefined processing procedures to the logs for multiple purposes. On the other hand, an STB 117 in a household 180 may report the new metering data it has accumulated to the distributed measurement server 150 more frequently (e.g., from every hour or every minute). The metering data from the different sources may serve different purposes from the perspective of the distributed measurement server 150. For example, the large volume of metering data from the TV metering data providers 102 can help the distributed measurement server 150 produce more accurate and less biased TV viewership rating estimates. But the metering data directly coming from individual household set top boxes can be used for making nearly real-time rating estimates.

Figure 3A:
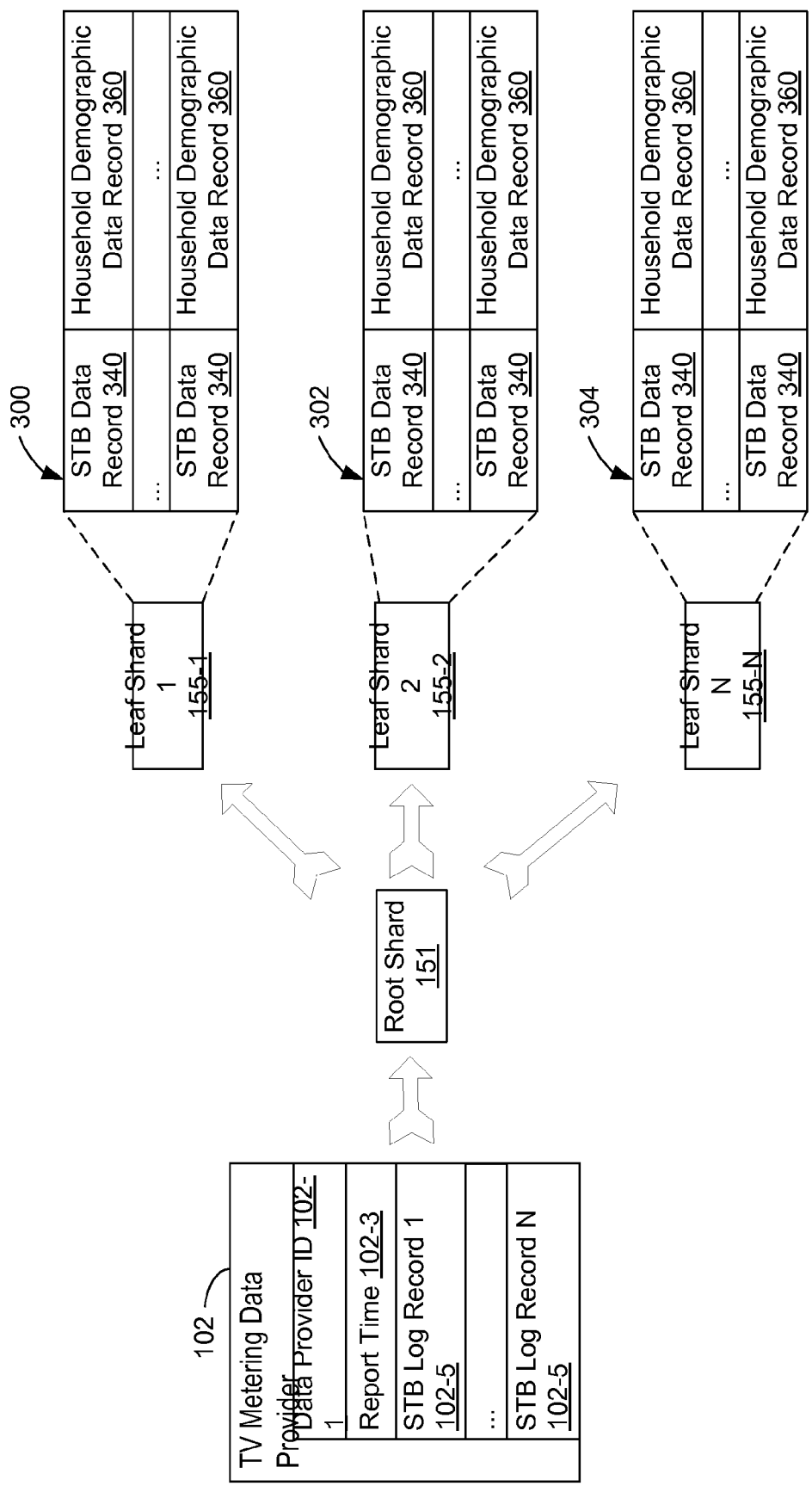
FIG. 3A is a block diagram illustrating how the TV viewership metering data is migrated from a data source through a root shard of the distributed measurement server into one or more leaf shards chosen by the root shard in accordance with some implementations.

FIG. 3A is a block diagram illustrating how the TV viewership metering data is migrated from a data source through a root shard of the distributed measurement server 150 into one or more leaf shards chosen by the root shard in accordance with some implementations. For illustration, the data source in this example is a TV metering data provider 102. As noted above, the TV metering data provider 102 may have accumulated a certain amount of TV metering data and is ready to transmit the data to the distributed measurement server 150. According to a predefined schedule, the TV metering data provider 102 sends the new metering data it has accumulated to the distributed measurement server 150. In some implementations, the metering data exists in one or more log files, each log file including a data provider ID 102-1 (which is uniquely associated with the TV metering data provider 102 to distinguish it from other data sources), report time 102-3 (which indicates when the log file was compiled), and a plurality of STB log records 102-5 (each record being associated with a set top box at a particular household).

FIG. 3B is a block diagram illustrating an exemplary data structure (e.g., an STB log record 102-5) used by a data source (e.g., a TV metering data provider 102) for organizing TV viewership metering data in accordance with some implementations. The STB log record 102-5 includes an STB ID 312 (which uniquely identifies one of the set top boxes or one of the households associated with the TV metering data provider 102), report time 314 (which indicates when the log record 102-5 was compiled by an STB 117 and reported to the TV metering data provider 102), log start time 316 and log end time 318 (which indicate the duration of the logging period), and a plurality of events 320, each event including an event ID 322, an event start time 324, an event end time 326, channel information 328, a content type 330, etc. The plurality of events 320 associated with an STB 117 record a household's activity of watching TV programs through the STB 117, such as when the TV was turned on/off, what programs the household has watched, how long each program has been watched, what type of programs the household has been watched, etc. For example, when a household switches from one channel to another channel, the STB 117 will generate a new event record for the new channel. Note that individual STB log records 102-5 can provide information about individual households' TV watching habits. By aggregating the STB log records 102-5 and correlating the viewership data with the corresponding geodemographic data, it is possible to get statistical information such as the rating of a TV program among a particular group of viewers within a specific geographical area, which is one of many important services provided by the distributed measurement server 150.

The distributed measurement server 150 includes one or more root shards 151 for requesting/receiving the metering data from different data sources and a plurality of leaf shards for allocating the metering data (see, e.g., FIG. 1B). As shown in FIG. 3A, upon receipt of the incoming metering data, the root shard 151 may apply the metering data to a predefined sharding function and choose one or more leaf shards to process the metering data. In some implementations, the predefined sharding function is implemented as a hash table. For a given data provider ID, there is a predefined set of leaf shards (e.g., 155-1 to 155-N) to host the metering data associated with this data provider ID. In order to improve the server's performance, the distributed measurement server 150 spreads the metering data from the same data source across multiple leaf shards. For example, the server 150 may set a maximum threshold such that one leaf shard should have no more than a predefined percentage or absolute amount of data from a particular data source (e.g., a TV metering data provider). In some implementations, the server 150 may also set a minimum threshold for a leaf shard on the amount of data from a particular data source. In some implementations, the root shard 151 forwards to each of the identified leaf shards (e.g., 155-1 to 155-N) a copy of the incoming metering data it receives from the TV metering data provider 102 so that the leaf shards can process the data in parallel. Each leaf shard screens the STB log records within the metering data one by one and chooses a subset of the STB log records to be stored in a data structure (e.g., 300, 302, or 304) stored in the memory of the leaf shard. A more detailed description of the data importation process at the distributed measurement server 150 is described below in connection with FIG. 4A.

FIG. 3C is a block diagram illustrating a data structure (e.g., an in-memory STB record 340) used by the distributed measurement server 150 for storing TV viewership metering data in accordance with some implementations. The distributed measurement server 150 keeps the incoming metering data in its original state as much as possible except for converting the metering data from its native format to a format maintained by the server 150. For each event 320 in the STB log record 102-5, a leaf shard determines whether or not there should be a corresponding in-memory STB record 340 and generates a corresponding STB record if the STB log record 102 is deemed to be allocated at the leaf shard. In some implementations, the in-memory STB record 340 includes a record ID 342 (which may include information identifying a data provider ID, an STB ID, and an event ID associated with the record), channel information 344, content start time 346, content end time 348, a TV information index 350 (which may be used for identifying the attributes of the TV used for watching the content, such as type, dimension, manufacturer, etc.), a household ID 352 (which is used for identifying the demographic data of the household for which the record 340 is generated), playback time 354 (which indicates the local time when the household watches the content), a viewing type 356 (which indicates whether the household watches the content live or on a DVR), and an STB type 358 (which indicates the type of the STB that contributes the STB record 340). In some implementations, the STB records associated with a leaf shard are stored in the computer's memory, which makes the query processing more efficient. In some implementations, the leaf shard compresses each record and stores the compressed record in the memory in order to save space for hosting more records. When responding to a query, the leaf shard decompresses once record at a time and determines whether the decompressed record satisfies the query or not. Many well-known data compression/decompression schemes (e.g., Lempel-Ziv) can be used for this purpose.

FIG. 3D is a block diagram illustrating a data structure (e.g., a household demographic record 360) used by the distributed measurement server 150 for storing a household's demographic data in accordance with some implementations. As noted above, the account information database 132 stores the demographic data from millions of households for different purposes such as billing and system maintenance. In some implementations, the distributed measurement server 150 maintains at least a subset of the demographic data associated with each household. For example, a leaf shard stores all the metering data from a particular household as well as the household's demographic data. As will be explained below, the household demographic data could be part of a query itself or the corresponding result. In some implementations, the household demographic record 360 includes a household ID 362, a household address 364, number of household members 366, household income 368, household member education 370, and household member age and gender information 372. For efficiency, a leaf shard may also store the household demographic data in its memory. Upon receipt of a query that has a household-related precondition, the leaf shard can quickly skip the metering data associated with a particular household if the household's demographic data fails the precondition. For example, if the query is limited to the households within a geographical region, the leaf shard does not need to decompress a household's associated metering data if the household's address indicates that it is outside the geographical region being queried. In some implementations, the in-memory household demographic data is not compressed because its size is often significantly smaller than the size of the metering data (e.g., one household may have thousands of STB records) and there is not too much gain from compressing the household data.

FIG. 3E is a block diagram illustrating a data structure (e.g., TV broadcaster information record 380) used by the distributed measurement server 150 for storing TV broadcaster information in accordance with some implementations. In some implementations, the same program may be broadcasted by different TV broadcasters on different channels. Sometimes, even the same TV broadcaster may have different channels for broadcasting the same program at different locations. If the query is to find out the rating of a program that is being broadcasted live by multiple broadcasters in the same region, the distributed measurement server 150 needs to have not only the broadcast schedule 384 but also the channel line-up data 386 for each broadcaster identified by its broadcaster ID 382 to avoid missing any STB records.

Figure 4A:
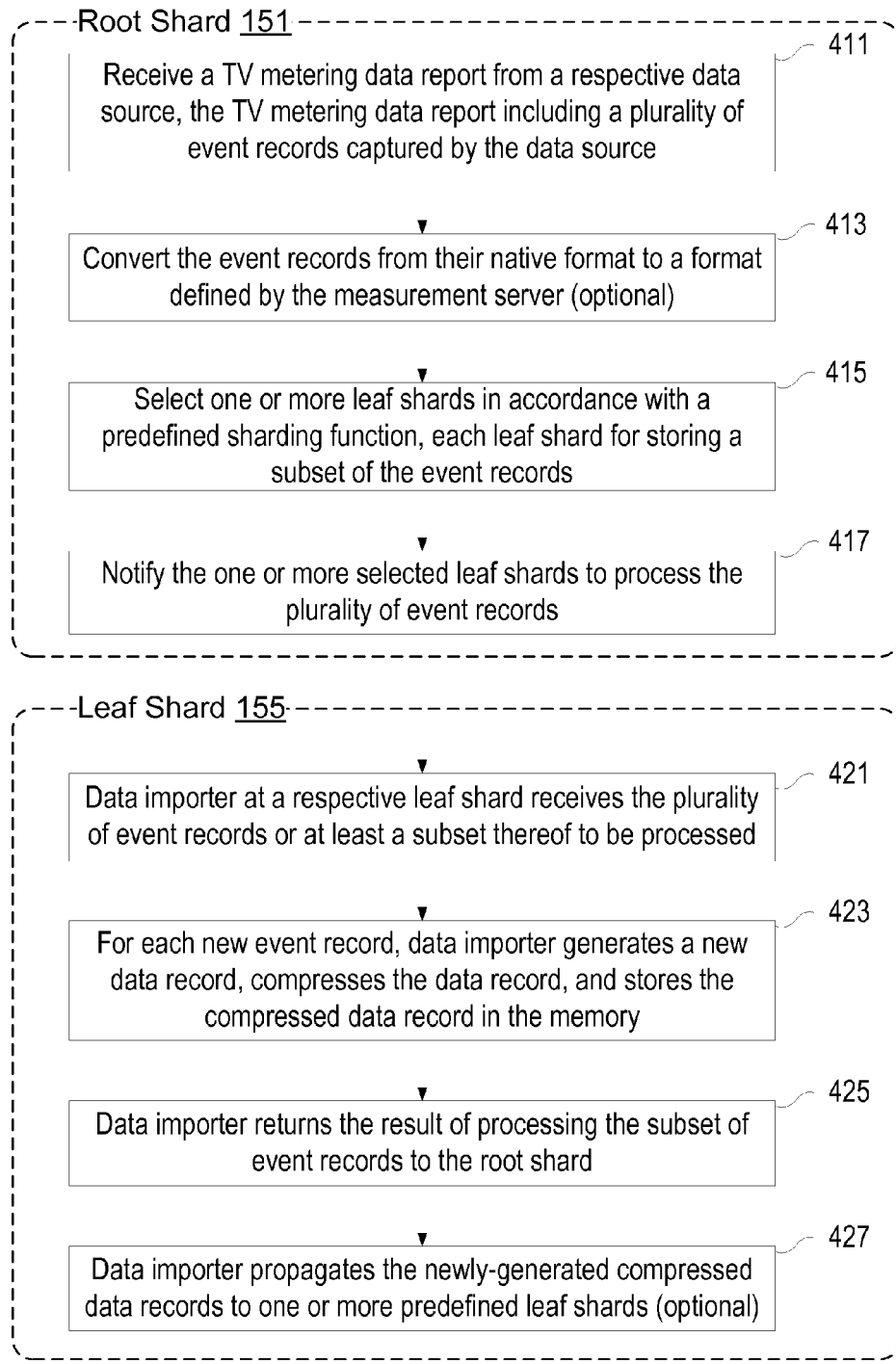
FIG. 4A is a flow chart illustrating how the distributed measurement server handles incoming TV viewership metering data provided by a data source in accordance with some implementations.

FIG. 4A is a flow chart illustrating how the distributed measurement server 150 handles the incoming TV viewership metering data provided by a data source (e.g., a TV metering provider or a set top box) in accordance with some implementations. Note that the metering data may be pushed to the server 150 by the data source or retrieved from the data source by the server 150. Within the distributed measurement server 150, there could be multiple computers that install the root shard module, each operating as a root shard and managing a predefined set of mixer or leaf shards for dealing with a predefined set of data sources. One of the root shards 151 receives (411) a TV metering data report from a respective data source. In some implementations, the data source is a TV metering data provider and the report includes a plurality of event records associated with different households that subscribe to the TV metering data provider. In some implementations, the data source is a set top box at a particular household and the report includes a plurality of event records associated with the household. Optionally, the root shard 151 converts (413) the event records from their native format to a format defined by the measurement server 150. Next, the root shard 151 applies the incoming metering data to a predefined shard function and selects (415) one or more leaf shards for handling the event records such that each leaf shard is responsible for hosting a subset of the event records. In some implementations, the identity of the data source may be used for determining which leaf shards have been designated for handling metering data from this data source. For leaf shards that have replicas of the same metering data, the root shard 151 also considers their current load balance (e.g., some of them may be servicing another query) and chooses the one that has relatively more load capacity than others. In some implementations, the root shard 151 configures its sharding function in a way such that there is a reasonable percentage of metering data from different geographic regions on the same computer so that a shutdown of one of the computers in the distributed measurement server 150 does not adversely affect the accuracy of the query results. Ultimately, the new metering data stored at one leaf shard will be replicated into the other leaf shards. Finally, the root shard 151 notifies (417) each of the selected leaf shards to process the plurality of event records, e.g., allocating a subset of the records in its memory for subsequent query service.

At each leaf shard 155 identified by the root shard 151, a data importer module receives (421) the plurality of event records or at least a subset thereof. In some implementations, different leaf shards 155 selected by the root shard 151 each have independent access to the incoming metering data. For each new event record, the data importer module generates a new metering data record, compresses the data record, and stores the compressed data record in its memory (423). Different leaf shards process the event records in parallel so that every record ends up being stored by one of the leaf shards. In some implementations, the data importer module returns (425) the processing result to the root shard 151 and the processing result may identify the subset of event records stored at this particular leaf shard. The root shard 151 may use such information to update its sharding function so that, e.g., upon receipt of a query, the root shard 151 can determine which leaf shard may have the metering data matching the query. In some implementations, the data importer module also propagates (427) the newly-generated data records to the other leaf shards if each of them is designated to have a replica of the data records.

In some implementations, different leaf shards may have replicas of metering data associated with different data sources or even different sets of households to improve the distributed measurement server's load balance and avoid one of them being the bottleneck that adversely affects the server's overall performance. For example, assuming that there are three leaf shards and three data sources, the metering data from the three data sources may be stored on the three leaf shards according to the following relationship table:

|  | Leaf Shard 155-1 | Leaf Shard 155-2 | Leaf Shard 155-3 |
|---|---|---|---|
| Data Source 102-1 | Metering Data | Metering Data |  |
| Data Source 102-2 | Metering Data |  | Metering Data |
| Data Source 102-3 |  | Metering Data | Metering Data |

One goal of the present invention is for the distributed measurement server 150 to provide answers to queries like how many household/people are watching a TV show and their geodemographic distribution in a real-time fashion. The distributed measurement server 150 can achieve this goal by responding to queries from clients 170 even if it stores billions of TV viewership metering data records.

Figure 4B:
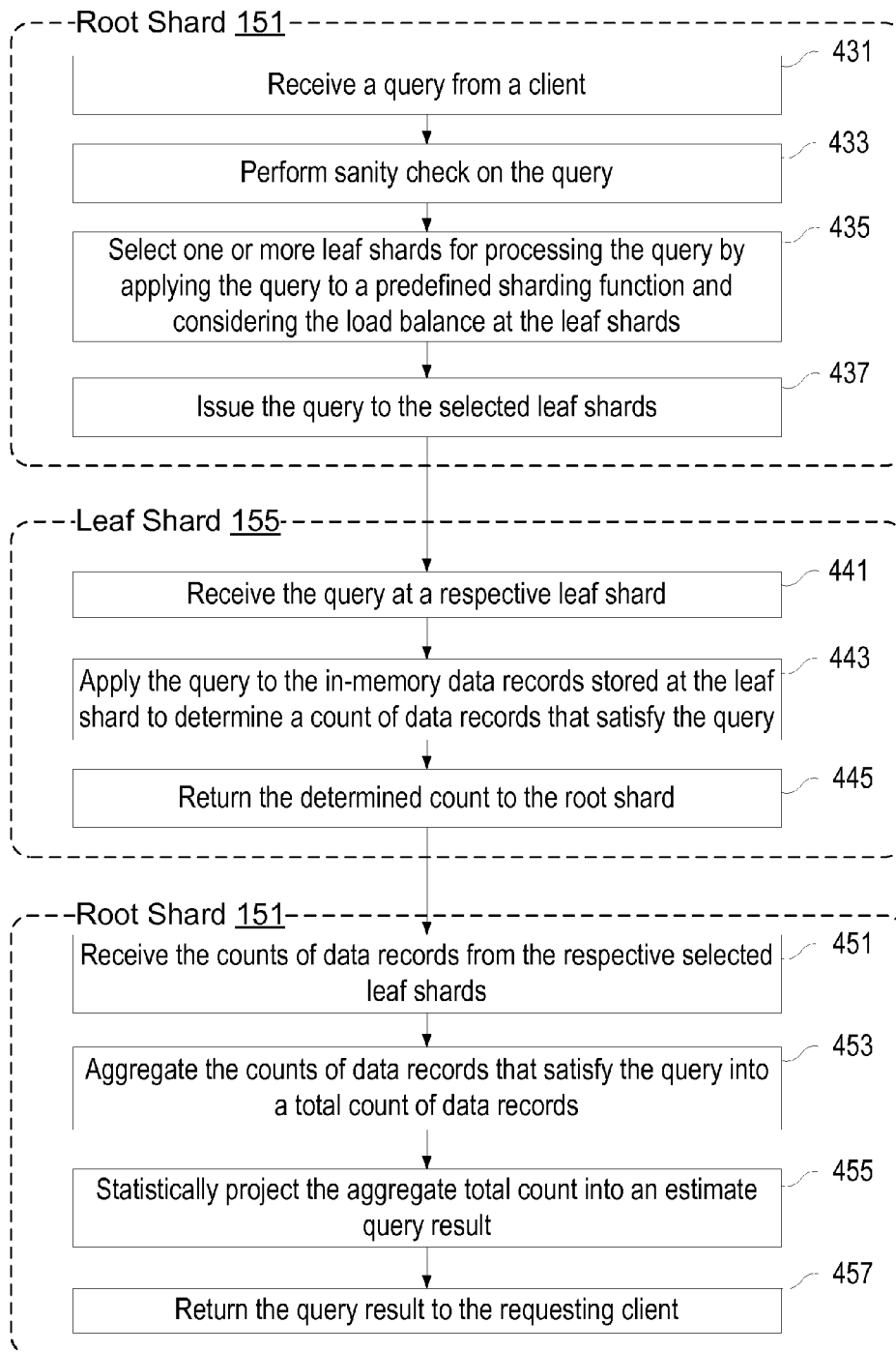
FIG. 4B is a flow chart illustrating how the distributed measurement server applies a query from a client to the TV viewership metering data and returns the query result to the requesting client in accordance with some implementations.

FIG. 4B is a flow chart illustrating how the distributed measurement server 150 applies a query from a client 170 to the TV viewership metering data and returns the query result to the requesting client in accordance with some implementations. Initially, a root shard 151 of the server 150 receives (431) a query from a client 170. The client 170 may provide the query by making an API call to the root shard 151. For example, a query for determining the viewership rating for a particular channel of a particular broadcaster (e.g., "Broadcaster_Channel_Num") during a particular time interval (e.g., from Jul. 1, 2011 to Jul. 2, 2011) can be expressed as follows:

'content <time <interval <start_time: "2011-07-01",
end_time: "2011-07-02">>, metered_channel <channel_info:
"Broadcaster_Channel_Num">>'.

The query above can be further modified such that the query result is grouped by another parameter associated with the in-memory STB records (e.g., STB_Type) as follows:

'content <time <interval <start_time: "2011-07-01",
end_time: "2011-07-02">>, metered_channel <channel_info:
"Broadcaster_Channel_Num">>, group_by_spec
<screen_group_by_expr: "STB_Type">'.

The query above can be further modified such that the query result is derived by processing at least a predefined amount (e.g., 50%) of applicable TV metering data stored at the distributed measurement server 150 as follows:

'content <time <interval <start_time: "2011-07-01",
end_time: "2011-07-02">>, metered_channel <channel_info:
"Broadcaster_Channel_Num">>, group_by_spec
<screen_group_by_expr: "STB_Type">, min_data_set: 0.5'.

The query above can be further modified such that the query result is limited to a particular viewing type (e.g., DVR-only) viewership type as follows:

'content <time <interval <start_time: "2011-07-01",
end_time: "2011-07-02">>, metered_channel <channel_info:
"Broadcaster_Channel_Num">>, viewing_type_filter
<dvr_capable_only: true>, group_by_spec
<screen_group_by_expr: "STB_Type">, min_data_set: 0.5'.

Upon receipt of the query, the root shard 151 performs (433) a sanity check on the query to make sure that the query is grammatically correct. If the query fails the sanity check, the root shard 151 returns an error message to the requesting client and may also explain the error(s) identified in the query. For each query that passes the sanity check, the root shard 151 applies the query to a predefined sharding function and selects one or more leaf shards for processing the query (435). In some implementations, this step is similar to the step 415 of selecting leaf shards for handling the incoming metering data, i.e., the root shard not only considers whether a leaf shard has the metering data associated with the query but also takes into account of the load balances at different leaf shards. For example, if a leaf shard does not have metering data related to the TV broadcaster identified in the query, the root shard 151 will not choose this leaf shard. But even if a leaf shard has the metering data, the root shard 151 still needs to consider the leaf shard's overall health condition, e.g., whether the current work load at the leaf shard makes it the most qualified leaf shard for handling this query. Finally, the root shard 151 issues (437) the query to each of the selected leaf shards.

At a particular leaf shard 155, the query engine module receives (441) the query and then applies (443) the query to the data record stored at the leaf shard to determine a count of data records that satisfy the query. A more detailed description of how the leaf shard 155 applies the query to the metering data stored at the leaf shard is provided below in connection with FIG. 4C. Finally, the leaf shard 155 returns (445) the determined count to the root shard 151. As noted above in connection with FIG. 1B, the distributed measurement server 151 is implemented in a tree-like hierarchical architecture. Different leaf shards 155 process the same query in parallel and return the respective determined counts of metering data records that satisfy the query. Because different leaf shards deal with different sets of metering data records, no data record would be counted twice and the final query result is achieved by aggregating the partial query results from different leaf nodes. Depending on whether the hierarchical architecture includes any mixer shard, the aggregation may be performed by the root shard 151 alone or by one or more mixer shards 153 and then the root shard 151.

As shown in FIG. 4B, assuming that there is no intermediate mixer shard involved in the aggregation process, the root shard 151 receives (451) the partial counts of data records from the respective leaf shards and aggregates (453) the partial counts into a total count of data records that satisfy the data records. In some implementations, there is no need for the distributed measurement server 150 to examine every possible metering data record in order to provide an accurate query result. This is especially true if the client 170 (e.g., an advertiser) is more interested in a query result that is statistically accurate enough to his or her satisfaction. In some implementations, it is very difficult for the distributed measurement server 150 to provide an extremely precise query result because there might be too much data to process such that the client 170 has to wait for a long time (e.g., a few hours) to get any query result. To satisfy the needs by different types of clients, the final query result processing module 222 of the distributed measurement server 150 implements a statistical projection function to project (455) the query results returned by the leaf shards 155 into a query result statistically estimated from the entire metering data set managed by the server 150. Finally, the root shard 151 returns (457) the estimated query result to the requesting client 170.

In some implementations, the root shard 151 uses the measurement server 150's sharding function, shard health, and load information to identify a subset of data sample within a cluster of leaf shards within the server 150 for evaluating the query. After counting a total sample size within the cluster, the root shard 151 propagates the total sample size per cluster across all the other leaf shards 155 along with the original query as defined by the hierarchical architecture shown in FIG. 1B. In particular, each leaf shards determines a respective cluster weight defined as "$k_c/K_c$," wherein $k_c$ and $K_c$ are the total sample size (as determined before) and the total size of the target population in the cluster c, respectively. For each cluster, the root shard 151 determines a weighted average, scales the weighted average to the entire target population, and adds the scaled values together for the total population. In some other implementations, for each STB, a leaf shard computes a weight defined as "$k_c/K_c$," where $k_c$ and $K_c$ are the sample size and the total size of the target population in the leaf shard. Next, the root shard 151 performs the weighted average among all the leaf shards based on the sample size of each leaf shard. For other implementations of the statistical projection, please refer to U.S. Provisional Patent Application No. 61/501,105, and U.S. patent application Ser. No. 12/055,906, each of which is incorporated by reference in its entirety.

Figure 4C:
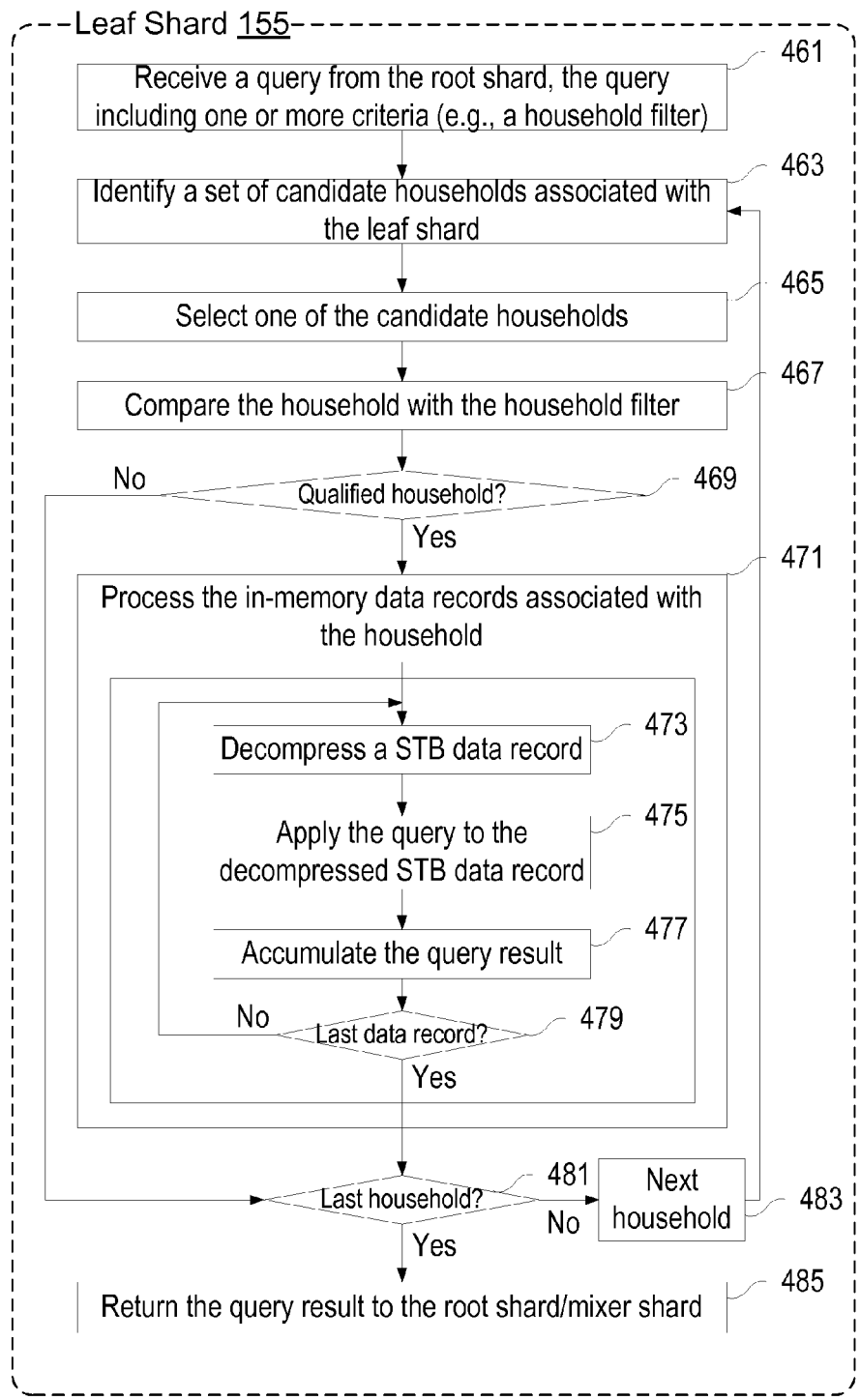
FIG. 4C is a flow chart illustrating how a leaf shard of the distributed measurement server identifies TV viewership metering data that satisfies a query in accordance with some implementations.

FIG. 4C is a flow chart illustrating how a leaf shard 155 of the distributed measurement server 150 identifies TV viewership metering data that satisfies a query in accordance with some implementations. The leaf shard 155 receives (461) a query from the root shard 151. In some implementations, the query includes one or more criteria (e.g., a household filter). Next, the leaf shard 155 identifies (463) a set of candidate households associated with the leaf shard based on their demographic data and selects (465) one of the households for further process. In some implementations, when a particular query arrives at a particular computer at which the leaf shard 155 operates, all the demographic data used for processing this query is already in the computer's memory. The leaf shard 155 just needs to apply the query to the TV viewership data stored on the computer's memory, which makes the query process fast. For the selected household, the leaf shards 155 compares (467) it with the household filter. For example, if the household filter limits the query to households having one of a predefined set of zip codes, a household whose zip code is not found in the set will be treated as unqualified (469, No) and the leaf shard 155 moves to process the next household. But if the candidate household passes the household filter (469, Yes), the leaf shard 155 then starts to process the in-memory data records associated with the household (471). In some implementations, the leaf shard 155 identifies an in-memory STB data record associated with the household like the one shown in FIG. 3C. The leaf shard 155 decompresses (473) the data record (if it is compressed) and applies the query (i.e., the criteria associated with the query) to the decompressed data record (475). Generally, there are two possible outcomes from this step: (i) the data record satisfies all the criteria of the query or (ii) the data record fails at least one of the criteria of the query. In the first outcome, the leaf shard 155 accumulates (477) the query result by, e.g., increasing the count of satisfying data records by one. In the second outcome, the leaf shard 155 simply skips the record and moves to process the next data record until the last data record is processed (479, Yes). Because this approach processes one record at a time, it requires very little memory so that the leaf shard 155 can save more memory for storing the compressed data records. But because all the data records are stored in the memory, this approach is very efficient for returning a query result to the requesting client within a short time period (e.g., within a few seconds). After processing the last data record associated with the last household (481, Yes), the leaf shard 155 returns (485) the query result (e.g., a count of data records that satisfy the query) to the upper level shard in the hierarchical architecture (which may be a root shard or a mixer shard).

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A computer-implemented method, comprising:
at a distributed computer system including multiple computers, each computer having one or more processors and memory storing multiple event records, each event record including a predefined time interval:
receiving an event log file that includes a plurality of data source IDs, each data source ID having an associated set of event log entries and each event log entry including a time interval;
dynamically selecting one or more computers by applying the plurality of data source IDs to a predefined sharding function;
at each of the selected computers:
identifying at least one of the plurality of data source IDs that matches at least one of the event records stored on the computer;
for each identified data source ID and each of the set of event log entries associated with the identified data source ID:
determining a location in the memory of the computer in accordance with the event log entry's time interval and the time intervals of the event records stored on the memory of the computer;
generating a new event record for the event log entry, wherein the new event record includes the time interval associated with the event log entry;
storing the new event record at the determined location within the memory of the computer; and
in accordance with a predefined schedule, replicating event records from a respective one of the multiple computers to one or more other computers of the distributed computer system such that each event record has respective replicas on at least two computers of the distributed computer system.

2. The computer-implemented method of claim 1, wherein the multiple computers are configured into a predefined hierarchical architecture that includes one root shard and multiple leaf shards such that a computer operating as the root shard is responsible for receiving the event log file and selecting one or more computers as the leaf shards by applying the plurality of data source IDs to the predefined sharding function.

3. The computer-implemented method of claim 1, wherein the predefined sharding function defines a mapping relationship between a plurality of data sources that contribute the event records, each data source having a unique data source ID, and the multiple computers such that there are one or more predefined computers for storing event records originating from a respective data source.

4. The computer-implemented method of claim 1, wherein dynamically selecting the one or more computers further includes:
choosing at least two computers in accordance with the predefined sharding function, wherein the at least two computers have replicas of a same set of event records; and
selecting one of the at least two computers that has a relatively lower workload for processing the event log file.

5. The computer-implemented method of claim 1, wherein the event log file includes a plurality of TV metering data records collected from a plurality of households and each of the plurality of data source IDs in the event log file corresponds to a set top box of a particular household.

6. The computer-implemented method of claim 1, wherein the distributed computer system is configured to receive the event log file including multiple sets of event log entries from a TV metering data provider and the TV metering data provider receives the multiple sets of event log entries from respective set top boxes of multiple households according to a predefined schedule.

7. The computer-implemented method of claim 1, wherein the event records are allocated among the computers such that all the TV metering data collected from each particular household is stored on one respective computer.

8. The computer-implemented method of claim 1, wherein the event records are allocated among the computers such that the TV metering data collected from a plurality of households that are associated with a particular TV broadcaster is split among multiple computers and the TV metering data at a particular one of the multiple computers is no more than a predefined percentage of all the TV metering data associated with the TV broadcaster.

9. The computer-implemented method of claim 1, wherein the distributed computer system is configured to receive the event log file including one set of event log entries directly from a set top box of a particular household according to a predefined schedule.

10. The computer-implemented method of claim 1, wherein each event log entry includes channel information and a pair of event start time and event end time, indicating when a household starts watching a channel and when the household stops watching the channel.

11. A distributed computer system, comprising:
multiple computers that are connected to a computer network, each computer having one or more processors and memory storing one or more programs and multiple event records, each event record including a predefined time interval, wherein the multiple computers are configured to perform the following operations when executing the one or more programs:
receiving an event log file that includes a plurality of data source IDs, each data source ID having an associated set of event log entries and each event log entry including a time interval;
dynamically selecting one or more computers by applying the plurality of data source IDs to a predefined sharding function;
at each of the selected computers:
identifying at least one of the plurality of data source IDs that matches at least one of the event records stored on the computer;
for each identified data source ID and each of the set of event log entries associated with the identified data source ID:
determining a location in the memory of the computer in accordance with the event log entry's time interval and the time intervals of the event records stored on the memory of the computer;
generating a new event record for the event log entry, wherein the new event record includes the time interval associated with the event log entry;
storing the new event record at the determined location within the memory of the computer; and
in accordance with a predefined schedule, replicating event records from a respective one of the multiple computers to one or more other computers of the distributed computer system such that each event record has respective replicas on at least two computers of the distributed computer system.

12. The distributed computer system of claim 11, wherein the multiple computers are configured into a predefined hierarchical architecture that includes one root shard and multiple leaf shards such that a computer operating as the root shard is responsible for receiving the event log file and selecting one or more computers as the leaf shards by applying the plurality of data source IDs to the predefined sharding function.

13. The distributed computer system of claim 11, wherein the predefined sharding function defines a mapping relationship between a plurality of data sources that contribute the event records, each data source having a unique data source ID, and the multiple computers such that there are one or more predefined computers for storing event records originating from a respective data source.

14. The distributed computer system of claim 11, wherein the operation of dynamically selecting the one or more computers further includes operations of:
 choosing at least two computers in accordance with the predefined sharding function, wherein the at least two computers have replicas of a same set of event records; and
 selecting one of the at least two computers that has a relatively lower workload for processing the event log file.

15. The distributed computer system of claim 11, wherein the event log file includes a plurality of TV metering data records collected from a plurality of households and each of the plurality of data source IDs in the event log file corresponds to a set top box of a particular household.

16. The distributed computer system of claim 11, wherein the distributed computer system is configured to receive the event log file including multiple sets of event log entries from a TV metering data provider and the TV metering data provider receives the multiple sets of event log entries from respective set top boxes of multiple households according to a predefined schedule.

17. The distributed computer system of claim 11, wherein the event records are allocated among the computers such that all the TV metering data collected from each particular household is stored on one respective computer.

18. The distributed computer system of claim 11, wherein the event records are allocated among the computers such that the TV metering data collected from a plurality of households that are associated with a particular TV broadcaster is split among multiple computers and the TV metering data at a particular one of the multiple computers is no more than a predefined percentage of all the TV metering data associated with the TV broadcaster.

19. The distributed computer system of claim 11, wherein the distributed computer system is configured to receive the event log file including one set of event log entries directly from a set top box of a particular household according to a predefined schedule.

20. A non-transitory computer readable storage medium storing one or more programs configured for execution by a distributed computer system that includes multiple computers, each computer having one or more processors and memory storing multiple event records, each event record including a predefined time interval, the one or more programs comprising instructions for:
 receiving an event log file that includes a plurality of data source IDs, each data source ID having an associated set of event log entries and each event log entry including a time interval;
 dynamically selecting one or more computers by applying the plurality of data source IDs to a predefined sharding function;
 at each of the selected computers:
  identifying at least one of the plurality of data source IDs that matches at least one of the event records stored on the computer;
  for each identified data source ID and each of the set of event log entries associated with the identified data source ID:
   determining a location in the memory of the computer in accordance with the event log entry's time interval and the time intervals of the event records stored on the memory of the computer;
   generating a new event record for the event log entry, wherein the new event record includes the time interval associated with the event log entry;
   storing the new event record at the determined location within the memory of the computer; and
 in accordance with a predefined schedule, replicating event records from a respective one of the multiple computers to one or more other computers of the distributed computer system such that each event record has respective replicas on at least two computers of the distributed computer system.

21. The non-transitory computer readable storage medium of claim 20, wherein the event log file includes a plurality of TV metering data records collected from a plurality of households and each of the plurality of data source IDs in the event log file corresponds to a set top box of a particular household.

22. The non-transitory computer readable storage medium of claim 20, wherein the distributed computer system is configured to receive the event log file including multiple sets of event log entries from a TV metering data provider and the TV metering data provider receives the multiple sets of event log entries from respective set top boxes of multiple households according to a predefined schedule.

23. The non-transitory computer readable storage medium of claim 20, wherein the distributed computer system is configured to receive the event log file including one set of event log entries directly from a set top box of a particular household according to a predefined schedule.

* * * * *